United States Patent
Ono et al.

(10) Patent No.: US 6,747,655 B2
(45) Date of Patent: Jun. 8, 2004

(54) MONITOR SYSTEM, DISPLAY DEVICE AND IMAGE DISPLAY METHOD

(75) Inventors: Makoto Ono, Yokohama (JP); Tetsu Kubota, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 09/799,474

(22) Filed: Mar. 5, 2001

(65) Prior Publication Data

US 2001/0052902 A1 Dec. 20, 2001

(30) Foreign Application Priority Data

Mar. 6, 2000 (JP) .......................................... 2000-061033

(51) Int. Cl.[7] .............................................. G06F 15/16
(52) U.S. Cl. ........................ 345/502; 345/503; 345/505; 345/506
(58) Field of Search ................................ 345/501, 502, 345/503, 504, 505, 506, 520

(56) References Cited

U.S. PATENT DOCUMENTS 5,956,046 A * 9/1999 Kehlet et al. ................ 345/502
6,049,316 A * 4/2000 Nolan et al. ................ 345/698
6,118,461 A * 9/2000 Taylor ........................ 345/520
6,266,042 B1 * 7/2001 Aratani ....................... 345/698
6,501,441 B1 * 12/2002 Ludtke et al. ............... 345/1.1

* cited by examiner

Primary Examiner—Matthew C Bella
Assistant Examiner—Mackly Monestime
(74) Attorney, Agent, or Firm—Robert M. Trepp; F. Chau & Associates, LLC

(57) ABSTRACT

To increase support a screen having a different aspect ratio or a large screen by use of existing graphics adapters, thus improving performance and flexibility of the whole system.

Disclosed is a monitor system comprising a liquid crystal display having a liquid crystal panel which displays an image and has a display area virtually divided into a plurality of divided area, and a plurality of graphics adapters to for developing image data for the divided areas of the liquid crystal display, wherein the divided areas of a screen in the liquid crystal display are obtained by further dividing an area in which the graphics adapters to create images, and a reconstruction circuit for reading out image data developed in the graphics adapters in turn to reconstruct the image data is provided.

14 Claims, 9 Drawing Sheets

FIG. 2

| 4 | 3 | 3 | 4 |
|---|---|---|---|
| 2 | 1 | 1 | 2 |
| 2 | 1 | 1 | 2 |
| 4 | 3 | 3 | 4 |

FIG. 5

| 1 | 3 | 1 | 3 |
|---|---|---|---|
| 2 | 4 | 2 | 4 |
| 3 | 1 | 3 | 1 |
| 4 | 2 | 4 | 2 |

MONITOR SYSTEM, DISPLAY DEVICE AND IMAGE DISPLAY METHOD

BACKGROUND OF THE INVENTION

1. Technical Field

The present invention relates generally to a display system using a plurality of graphics adapters and, more particularly to an image display device adopting an image dividing method which demonstrates excellent performance and great flexibility.

2. Description of the Related Art

A high resolution display which showed a slow progress with respect to a CRT display has been making rapid progress with introductions of new technologies such as liquid crystal liquid. To be more specific, the liquid crystal display (LCD) can achieve a high resolution more easily compared to the CRT display by microfabricating it. With respect to this LCD, high definition (ultra-high resolution) displays with a very high resolution such as QXGA (Quad Extended Graphics Array) (2048×1536 dots), QSXGA (Quad Super Extended Graphics Array) (2560×2048 dots), and QUXGA (Quad Ultra Extended Graphics Array) (3200× 2400 dots) have been put to practical use by making a panel itself into a high definition one.

On the other hand, a device called a graphics adapter for performing image creation and the like to display an image on a display is provided in a personal computer (PC). A memory for writing and storing the image to be displayed on the display is provided in the graphics adapter, and this memory is called a frame buffer.

As a technique for performing a high resolution display, there has been one to divide a screen to display an image using a plurality of graphics adapters. Specifically, this technique has a feature in that instead of developing a special graphics adapter having a large frame buffer, using an ordinary graphic adapters, a screen is divided into two to four sections, one graphics adapter is assigned to the corresponding section, and a corresponding image is displayed. These techniques are generally called 'Partitioning Method' or 'Tiling Method.' FIG. 8 is a diagram for explaining a conventional screen dividing method. As for implementation, it is constructed that Four graphics adapters 201 to 204 are installed at an adapter slot of PC or a work station (WS), and each of the graphics adapter 201 to 204 is assigned to corresponding one of sub-screens that are divided areas of the screen 205, 205a to 205d. To be more specific, each of the graphics adapters 201 to 204 is allowed to be assigned symmetrically to the corresponding one of the divided areas having the same shape, and the screen 205 is divided crosswise. The sub-screens 205a to 205d, each of which is the divided area, are driven so as to create an image by the corresponding graphics adapters 201 to 204. 205a to 205d, the divided areas of the screen 205, have a size, which is a proper scale for the graphics adapters 201 to 204 to create an image.

With respect to a size of the whole screen of the foregoing ultra-high resolution display, the ones having aspect ratios, that is, ratios of the length of the screen to the width thereof 4:3 or 5:4, such as QXGA (2048×1536 dots) and QSXGA (2560×2048 dots), have been the main stream. However, with the diffusion of high definition televisions (HDTV) (and the like), displays and graphics adapters, which have a new aspect ratio such as an aspect ratio in which 1920 dots in the horizontal direction and 1200 dots in the vertical direction are arranged, come to appear. When this display for use in the HDTV is displayed using a plurality of graphics adapters for a high resolution by the screen dividing method, it is impossible to effectively use a frame buffer in each graphics adapter, because a size of whole screen is not equal to an integral multiple of a size of the sub-screen, which is a proper scale for one graphics adapter to create an image.

FIG. 9 is a diagram for explaining the case where a size of the sub-screen, which is a proper scale for one graphics adapter to create an image, is not equal to an integral multiple of a size of the whole screen. In FIG. 9, illustrated is a case where four graphics adapters, each of which includes 1280 dots horizontally and 1024 dots vertically, are used, and an image is displayed on a display (portion indicated by slanted lines) including 1920 dots horizontally and 1200 dots vertically. In this case, since the size of the display is larger than that of one graphics adapter, in other words, since one graphics adapter is narrower than the display (portions indicated by slated lines) both by length and by width, four graphics adapters are necessary as shown in FIG. 9. For this reason, as can be understood from FIG. 9, a useless memory area other than the portion indicated by slanted lines is very large, and hence it was impossible to effectively use the system.

Work stations comprising only one extension slot showing a fast transfer rate and a large bus width in addition to a standard slot can be recently found. In these work stations, for example, one high speed graphics adapter using AGP (Accelerated Graphics Port) and graphics adapters using a PCI bus (Peripheral Component Interconnect bus) bus are allowed to be mixedly present. When it is intended to use a plurality of graphics adapters, the graphics adapters using the PCI bus are used in many cases for the reason that as to the AGP, only one port can be used for the system. However, though it is tried to increase a processing speed by inserting one graphics adapter among the four graphics adapters in the extension slot, the processing speed cannot be increased because the processing speed is ruled by other three graphics adapters. Accordingly, it is impossible to improve performance of the whole of the system.

SUMMARY OF THE INVENTION

The present invention is invented to solve the above-described technical problems. The object of the present invention is to provide a monitor system adopting an excellent screen dividing method from a viewpoint of performance and flexibility in a display system using a plural of graphics adapters.

Another object of the present invention is to effectively use a frame buffer of a graphics adapter by reducing a useless memory area, even when an aspect ratio of the graphics adapter and an aspect ratio of a display differ from each other.

To achieve the foregoing object, in the monitor system of the present invention, when screens having different aspect ratios are supported by an existing graphics adapter or when a large screen is supported by a plurality of graphics adapters, an area for which each of graphics adapters can create an image (develop) is divided furthermore into a plurality of divided areas, image data divided by each graphics adapter in accordance with a specified assignment is developed, and the developed image data is reconstructed on a display side. Thus, loads are distributed to each graphics adapter. Therefore, the monitor system to which the present invention is applied comprises a display device having a screen for displaying an image, in which its display area is virtually divided into a plurality of divided areas; and a plurality of graphics adapters, each of which develops image data for corresponding one of the divided areas, wherein each divided area of the screen in the display device is obtained by further dividing an area for which one graphics adapter can create an image.

In such construction, the area for which each graphics adapter can create an image can be characterized by making it smaller than an area that can be displayed by the screen. The display device reconstructs a screen from the image data output from the graphics adapters based on assignment information for the respective divided areas. With such construction, a correct picture can be displayed from divided image data assigned based on characteristics of an application and performance of the system and the graphics adapter.

Furthermore, in the monitor system of the present invention, a high performance graphics adapter is assigned to a divided area having a heavy load on the screen. Thus, it is preferable that performance of the whole of the system can be improved. For example, when the monitor system is constructed so that a graphics adapter using a high performance AGP takes charge of image creation in a central portion of the screen, an image creation speed can be increased even when an application in which loads concentrate in the central portion like a system of, for example, CAD is executed.

The plurality of graphics adapters are assigned to the respective divided areas scattered on the screen to create images on the respective divided areas. Even when the plurality of graphics adapters having the same performance are used, it is possible by the distribution of the loads to cope with a problem in which the image creation speed is slowed down by a graphics adapter having the heaviest load.

When the present invention is comprehended from another point of view, a monitor system comprises: a display device including a screen for displaying an image with a resolution of a first aspect ratio; and a plurality of graphics adapters, each having an area with a resolution of a second aspect ratio which is different from the first aspect ratio, for which image creation can be performed and each supplying, to the display device, image data corresponding to a resolution lower than that of the first aspect ratio of the screen, wherein the image data supplied from each of the graphics adapters divides the area with the resolution of the second aspect ratio, for which an image creation can be performed, into areas having a predetermined size, and undergoes a clipping processing; and the display device reconstructs the image data supplied from the plurality of graphics adapters, and outputs the image data to the screen with the resolution of the first aspect ratio. The aspect ration can be defined generally as a ratio of a lengthwise length to a crosswise length of an image.

The image data supplied from the graphics adapters is formed based on image creation assignment for divided areas obtained by virtually dividing the screen. The display device reads out the image data of the divided areas supplied from the plurality of graphics adapters in turn based on information of the image creation assignment, the image data being subjected to the clipping processing, and reconstructs the image data. This clipping processing is generally defined as an operation to cut off image data corresponding to portions of a screen other than those taken charge of by one of the graphics adapters. The image creation assignment is the one for determining which graphics adapter takes charge of the image creation for a certain area of the screen.

When the present invention is comprehended from the display device side, in the present invention, a reconstruction section is provided in the display device, and the image data, which has a size obtained by further dividing an area for which the graphics adapter can display an image, is read out in turn so that a correct picture is formed. This makes it possible to display an image on the ultra-high resolution display and the image on a display having a different aspect ratio. Specifically, a display device to which the present invention is applied comprises: a frame buffer for storing divided image data received from a plurality of graphics adapters capable of creating an image with a low resolution; a reconstruction section for reading out the divided image data stored in the frame buffer in turn based on a predetermined assignment, and forming display data; and a high resolution screen for displaying an image based on the display data formed by the reconstruction section, wherein the divided image data stored in said frame buffer is formed by further dividing the data of an area having a proper size which is a proper scale for a plurality of graphics adapters to create an image. Here, the high resolution screen is used as a display area an aspect ratio different from that of an area having a proper size which is a proper scale for a plurality of graphics adapters to create an image.

The present invention is directed to a method of displaying an image on a large screen by use of a plurality of graphics adapters, which comprises the steps of: forming divided image data from the image data to be displayed having a size obtained by further dividing an area which said graphics adapters can develop; reading out the divided image data developed into the graphics adapters in a predetermined order and reconstructing the image data; and displaying an image on the screen based on the image data reconstructed.

Assignments of the divided image data to the graphics adapters are performed based on assignment information indicating which portion of the screen is taken charge of by a specific graphics adapter among the graphics adapters. The assignment information complies with assignment used when the divided image data is assigned to a plurality of graphics adapters to be developed in them. The present invention may be constructed so that the assignment information is transmitted to the display device along with the image data. Moreover, the present invention can be constructed so that the assignment information is determined by circuits previously fixed. Specifically, a reconstruction of the image data is read out in a predetermined order based on the assignment information. This makes it possible to display the image data as a correct picture even when the image data is randomly divided in accordance with characteristics of the application. With respect to the divided image data, an area which can be developed by the graphics adapter is divided into different sizes or an even size.

On the other hand, when the present invention is comprehended from another point of view, an image display method to display an image on a high resolution screen of a first aspect ratio, by use of a plurality of low resolution graphics adapters, each being capable of displaying an image having a second aspect ratio different from the first aspect ratio, which comprises the steps of: dividing image data to be displayed to form divided image data in a size obtained by dividing the image displayed by each graphics adapter into a plurality of areas; assigning the divided image data formed to each of the low resolution graphics adapters; reading out the divided image data assigned to each of said low resolution graphics adapters in an order to create a correct image on the high resolution screen, thus reconstructing the image data; and displaying the image data reconstructed on the high resolution screen. The reconstruction of the image data is to read out the divided image data in order based on assignment information to the low resolution graphics adapters. The assignments of the divided image data are determined in consideration of a degree of a load required for displaying the image data. This makes it possible to apply difference of capabilities among the graphics adapters to an unevenness of loads of the image data, and to improve the image creation performance by distributing the loads, thus improving performance of the whole of the system.

These and other aspects, features and advantages of the present invention will be described or become apparent from the following detailed description of the preferred embodiments, which is to be read in connection with the accompanying drawings.

BRIEF DESCRIPTION OF THE DRAWINGS

FIG. 2 is a diagram showing an example of a screen division method adopted in this embodiment.

FIG. 5 is a flowchart for explaining a processing to remove a special function from a construction in changing the construction of end points.

DETAILED DESCRIPTION OF THE PREFERRED EMBODIMENTS

The present invention will be described based on embodiments shown in attached drawings below.

Figure 1:
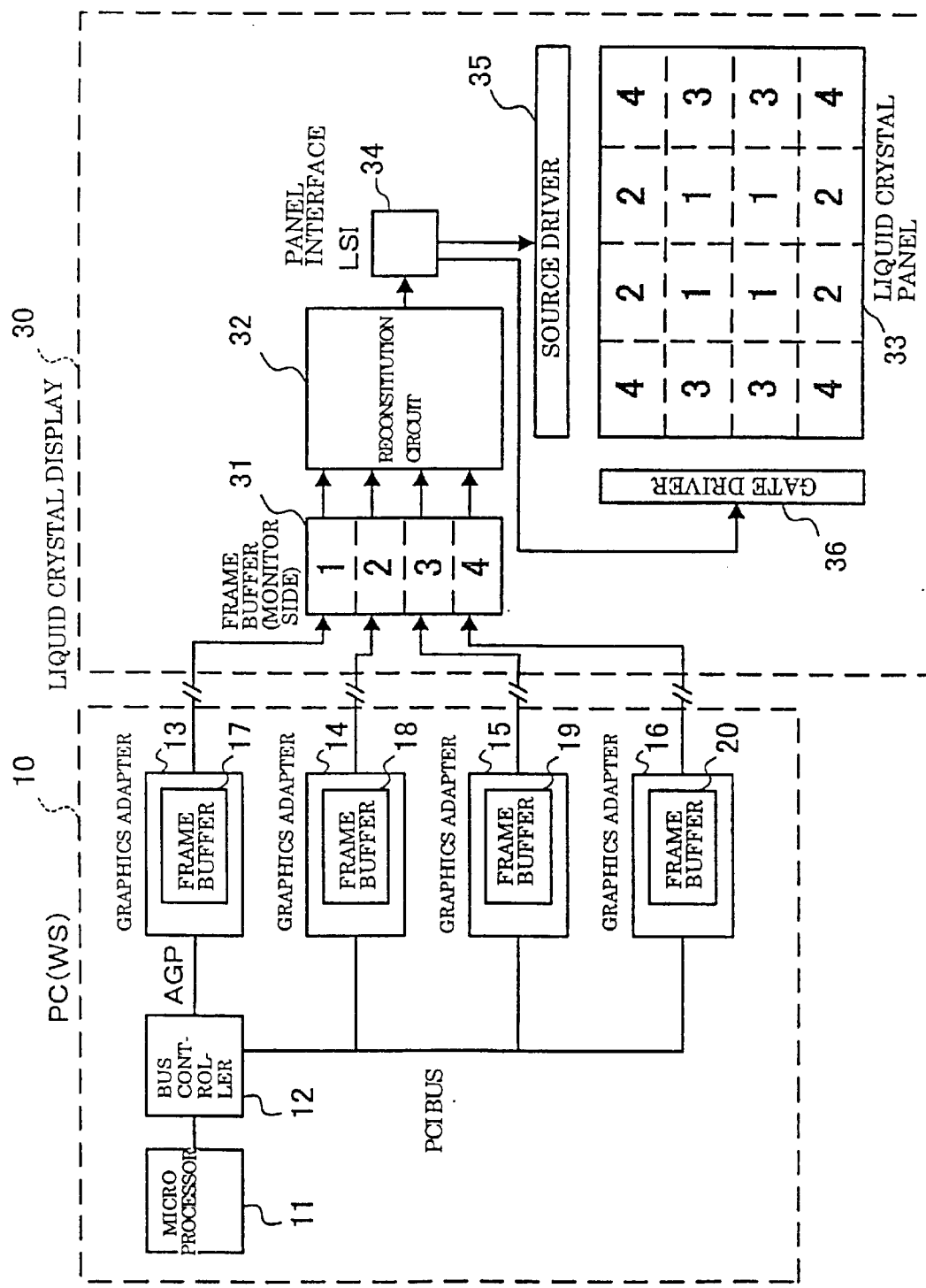
FIG. 1 is a block diagram for explaining a display monitor system to which this embodiment is applied.

FIG. 1 is a block diagram for explaining a display monitor system to which an embodiment is applied. The monitor system comprises a personal computer (PC) 10 or a work station (WS) 10 for generating image data to be displayed; and a liquid crystal display 30 as a display device for displaying an image based on the image data supplied thereto. The PC (WS) 10 comprises a microprocessor 11 for executing a dividing processing in this embodiment; and a bus controller 12 for controlling an AGP bus port and a PCI bus port. Furthermore, the PC(WS) 10 comprises four graphics adapters 13 to 16 corresponding to a resolution of, for example, 1280×1024 dots. The graphics adapters 13 to 16 have frame buffers 17 to 20 for storing image data, and image creation function, respectively. The graphics adapters 13 to 16 perform a clipping processing, respectively. The clipping processing is an operation to cut off image data corresponding to portions of a screen other than those taken charge of respective graphics adapters, 13 to 16. The clipping processing is sometimes performed by the microprocessor 11 by means of software. If the graphics adapters 13 to 16 are supported by hardware, the monitor system can be constructed so that the clipping processing is performed by each of the graphics adapters 13 to 16. Furthermore, in this embodiment, one graphics adapter 13 is constructed as a high performance AGP adapter, and other three graphics adapters 14 to 16 are PCI adapter.

On the other hand, the liquid crystal display 30 comprises a frame buffer 31 (on the monitor side) for temporarily storing image data supplied from the graphics adapters 13 to 16, and a reconstruction circuit 32 for performing a screen division and reconstructing the image data for a display screen, which has been subjected to the clipping processing. The reconstructing circuit 32 is incorporated in the liquid crystal display 30. In the liquid crystal display 30, the reconstruction circuit 32 is constructed in the form of logical hardware in accordance with a screen division style on the PC (WS) 10 side. Furthermore, the liquid display 30 further comprises a liquid crystal panel 33 as the screen for displaying an image, which is composed of, for example, a TFT array; a panel interface LSI 34 for generating timing pulses for driving the liquid crystal panel 33; a source driver 35 for outputting a voltage to be applied to each of source electrodes of TFTs in the liquid crystal panel 33; and a gate driver 36 for outputting a voltage to each of gate electrodes of the TFTs. Note that in this embodiment, a high resolution display such as QSXGA (2560×2048 dots) is used as the liquid crystal panel 33.

Figure 2:
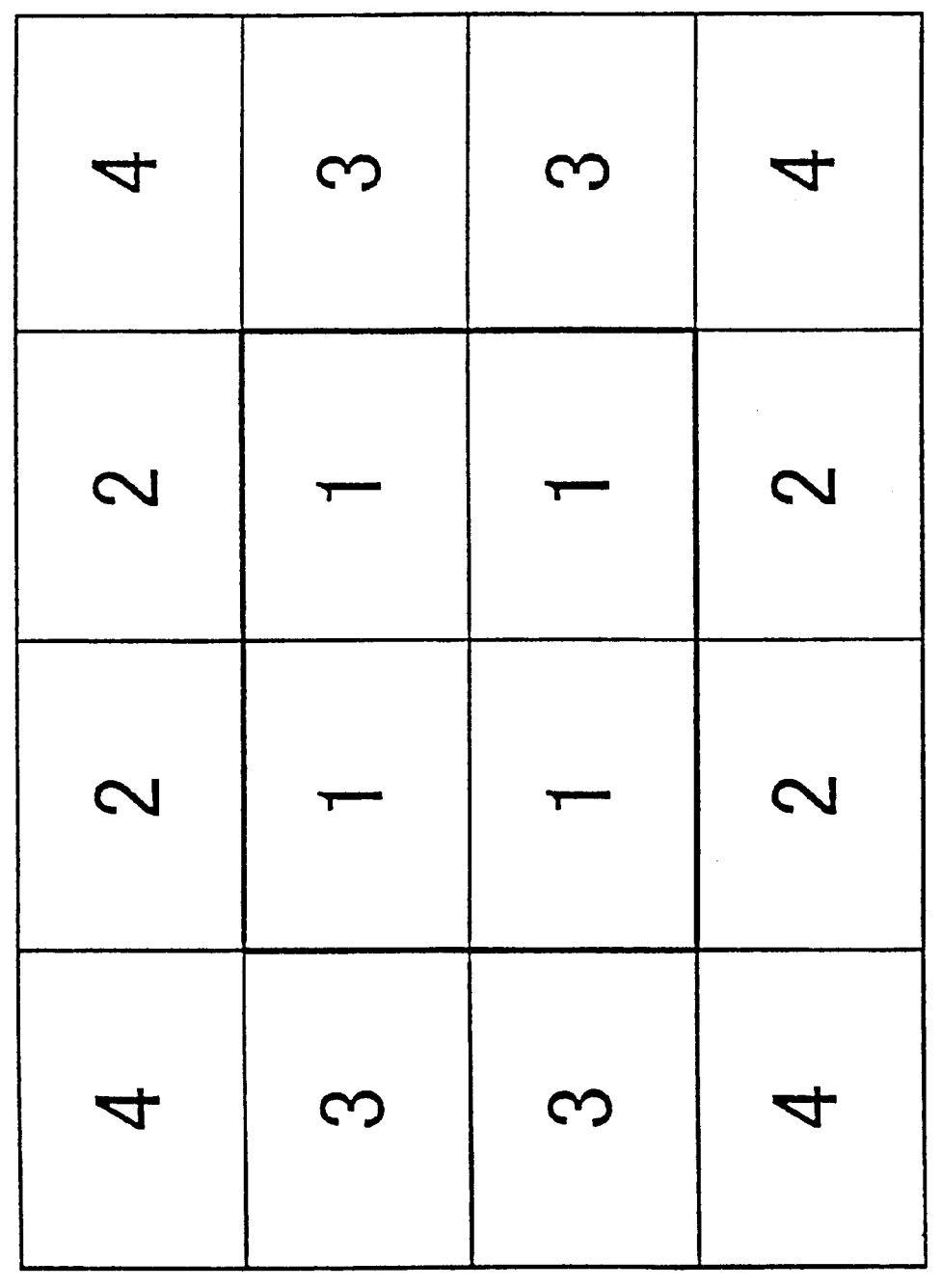
Figure 8:
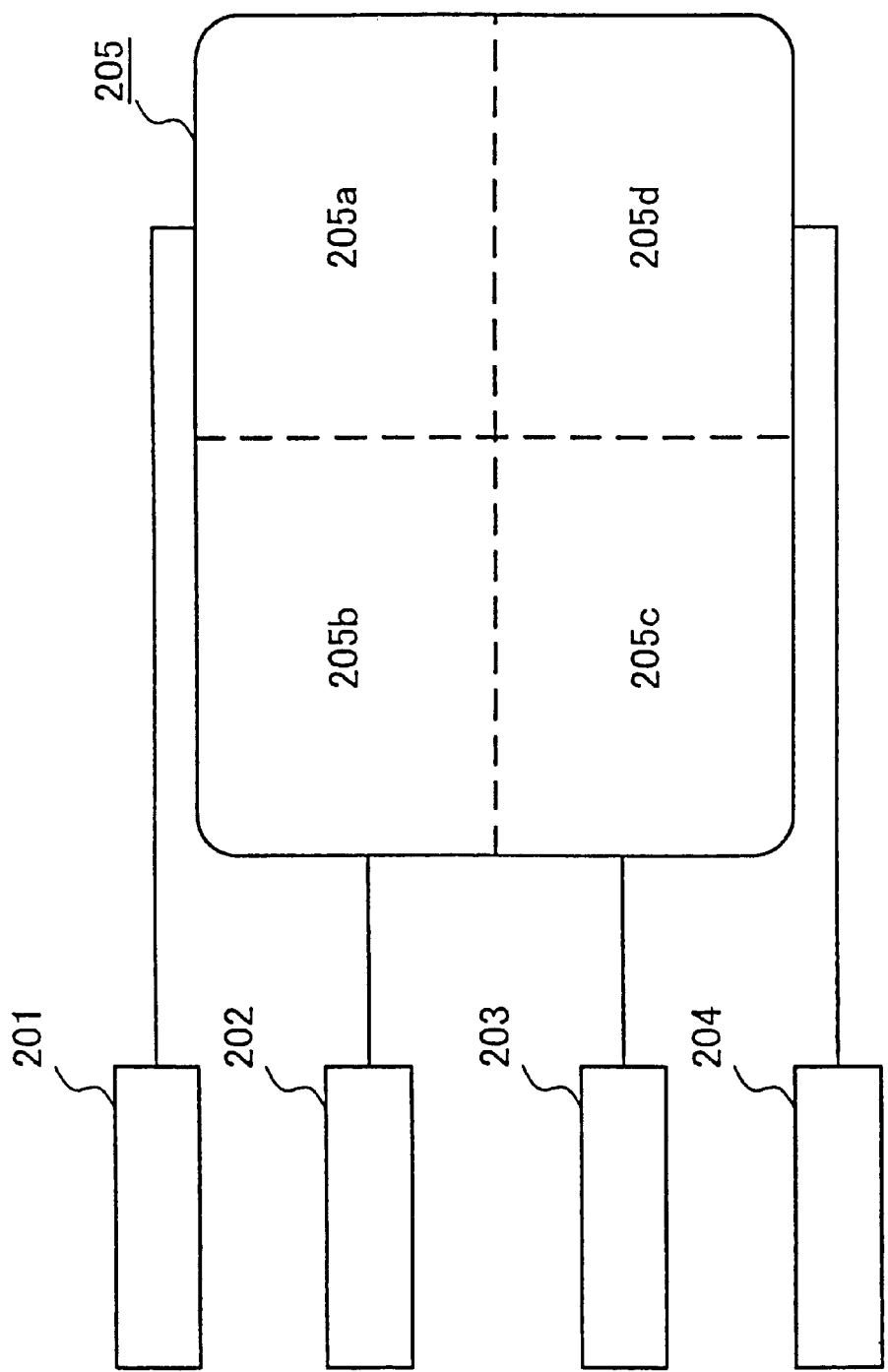
FIG. 8 is an explanatory view for explaining a conventional screen division method.

FIG. 2 is a diagram showing an example of the screen division method applied to this embodiment. Numbers 1 to 4 shown in FIG. 2 show states where they are assigned to the respective graphics adapters 13 to 16. The number 1 corresponds to the graphics adapter 13; the number 2, the graphics adapter 14; the number 4, and so on. Generally, in an applying operation using the high resolution display, a rate of image creation in the central portion of the screen becomes high. This trend is particularly conspicuous in CADs that is one of users of ultra high resolution displays. In the CADs, applications for displaying menus in the peripheral portions (for example, upper and lower portions) of the screen and for displaying CAD figures with a large quantity of information in the central portion thereof are used in many cases. At this time, when the screen is simply divided into four equally as shown in FIG. 8 which is used for describing the prior art, the central portion of the screen where image creation is performed most frequently is sectioned crosswise. Accordingly, the clipping processing occurs many times. General graphics adapters require interventions of a CPU for the clipping processing. When the clipping processing occurs many times, deterioration in performance is brought about. To solve such problems, in this embodiment, image creation is performed by the graphics adapter 13 for the central portion of the screen collected as the area 1, as shown in FIG. 2, and the other three graphics adapters 14 to 16 perform image creation for the respective periphery portions around the central portion. Thus, the screen is formed. With such construction, the clipping processing for the central portion can be lessened, and hence it is possible to improve performance of the monitor system.

Furthermore, when the screen division is performed as shown in FIG. 2, marked effects are particularly brought about with use of the high speed graphics adapter 13 using the AGP and the graphics adapters 14 to 16 using the PCI bus. Generally, when the plurality of graphics adapters 13 to 16 are used, for the reason that as to the AGP only one port can be used for the system, the graphics adapters using the PCI bus are used for other ports in many cases. However, when the area 1 is assigned to the central portion shown in FIG. 2 and the graphics adapter 13 using the AGP is assigned to the area 1, it is possible to use the unevenness of the loads well, and performance of the monitor system can be improved. To be more specific, one graphics adapter 13 is previously designed so as to be assigned to a large part of the image creation, and then the graphics adapter 13 is mounted to an extension slot showing a large transfer rate and a large bus width. A difference of the loads between the graphics adapter 13 and the graphics adapters 14 to 16 is absorbed, and hence performance of the whole of the system can be improved.

Figure 3:
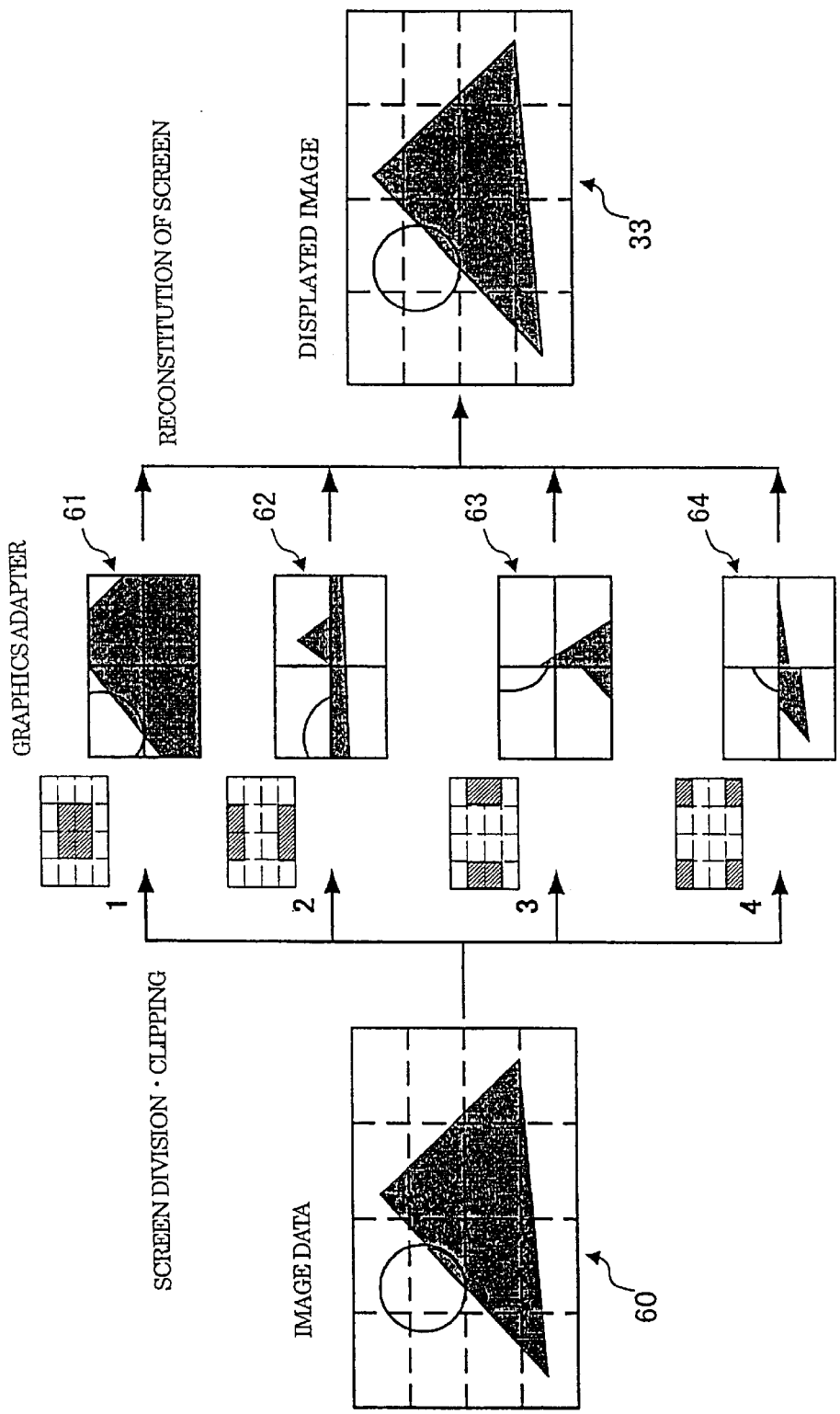
FIG. 3 is a diagram explaining a processing flow of the division method in this embodiment.

FIG. 3 is a diagram for explaining processing of the division method in this embodiment. Image data 60 supplied from the PC(WS) 10 on the host side is input to the respective graphics adapters 13 to 16. In the graphics adapters 13 to 16, the image data 60 is developed to the data 61 for the area 1, the data 62 for the area 2, the data 63 for the area 3 and the data 64 for the area 4, respectively, and the screen division and the clipping are performed. Here, since the division method shown in FIG. 2 is adopted, with regard to the area 1 the clipping processing performed so as not to write the protrusion areas is performed only for the peripheral portion around the place where the four divided areas collected together. Thereafter, the data 61 to 64 from the four graphics adapters 13 to 16 is collected and the screen is reconstructed, and the display screen is displayed on the liquid crystal panel 33. At this time, though the clipping processing is most frequently performed for the data 64 of the area 4, this area is considered that in general, a quantity of images is less and hence a load is less.

Figure 4:
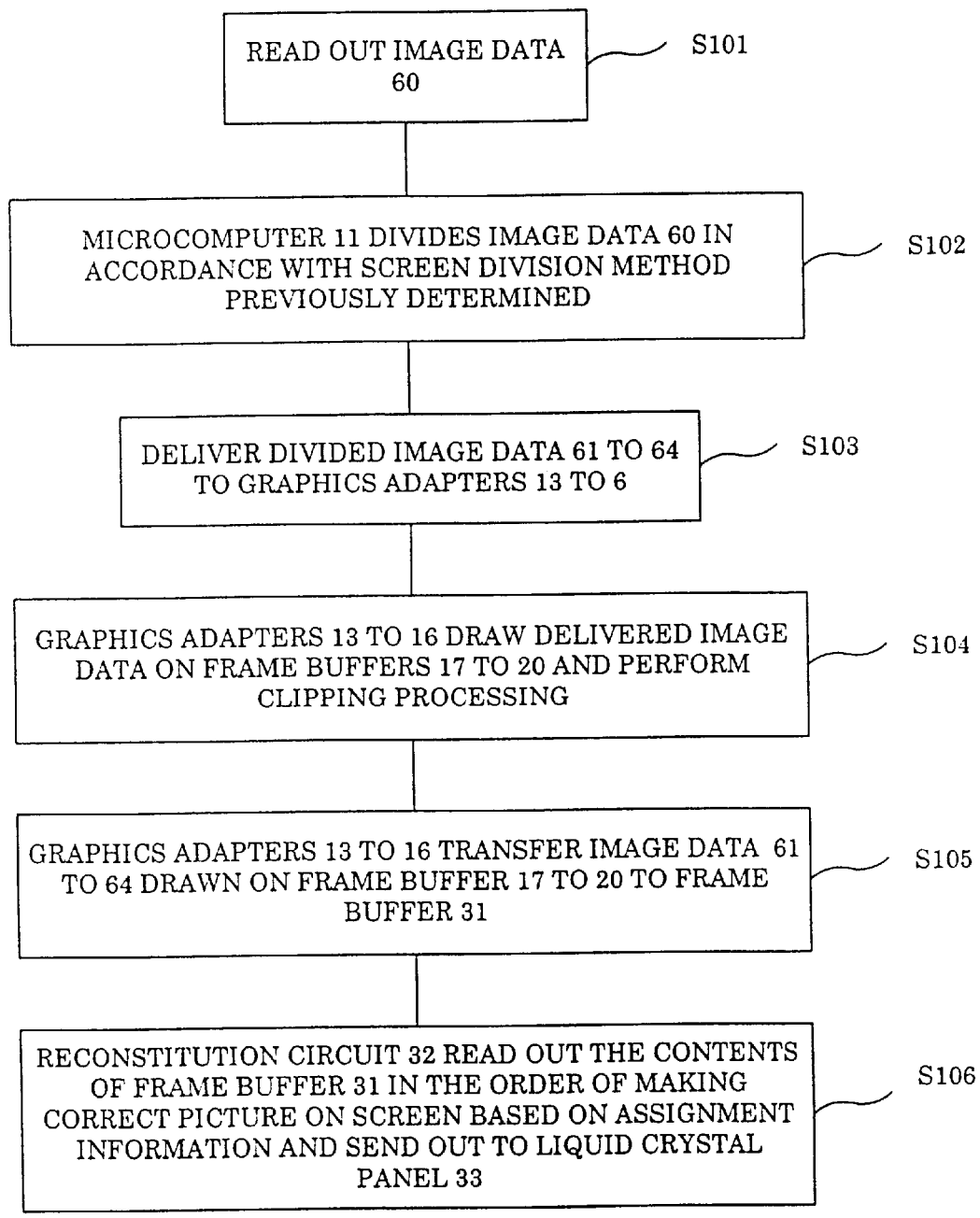
FIG. 4 is a flowchart showing a processing flow in this embodiment.

FIG. 4 shows a flowchart of a processing flow in this embodiment. Either the image data 60 to displayed on the large screen or the image data 60 to be displayed on the screen showing a different aspect ratio is read out (step 101). The microprocessor 11 is divided the image data 60 by means of software under a previously decided screen division method (step 102). This previously decided screen division method determines which portion of the screen the graphics adapters 13 to 16 takes charge of. The way how to divide the screen is determined based on characteristics of the application and performance of the system and the graphics adapters 13 to 16. Thereafter, the divided image data 61 to 64 is transferred to the corresponding graphics adapters 13 to 16 (step 103). In FIG. 1, though the description for the case where the four graphics adapters 13 to 16 are provided was made, the number of the graphics adapters is discretionary in accordance with the system or the performance.

The graphics adapters 13 to 16 to which the image data 61 to 64 is transferred perform image creation for the image data 61 to 64 in the corresponding frame buffers 17 to 20, and perform the clipping processing (step 104). At this time, the images created in the frame buffers 17 to 20 cannot be displayed on the screen when the pictures are not subjected to any processing as shown in FIG. 3. The clipping processing is an operation to cut off image data corresponding to portions of the screen other than those taken charge of respective graphics adapters 13 to 16. The clipping processing is sometimes executed by means of software, or the clipping processing can be executed by the graphics adapters 13 to 16 if the graphics adapters 13 to 16 are supported by hardware like this embodiment.

Thereafter, the graphics adapters 13 to 16 transfer the image data 61 to 64 created in the frame buffers 17 to 20 to the frame buffer 31 of the liquid crystal display 31 (step 105). Then, the reconstruction circuit 32 of the liquid crystal display 30 reads out the contents of the frame buffer 31, based on assignment information, in the order that a correct image is created on the screen, and transmits the contents read out to the liquid crystal panel 33 side (step 106). This assignment information is an information making the screen division method clear. The assignment information may be constructed, for example, so as to be transmitted from the PC (WS) 10 side to the liquid crystal display 30 in some way. Moreover, like this embodiment, the assignment information is previously determined when the system is designed, and a construction of the reconstruction circuit 32 may be fixedly provided.

Figure 5:
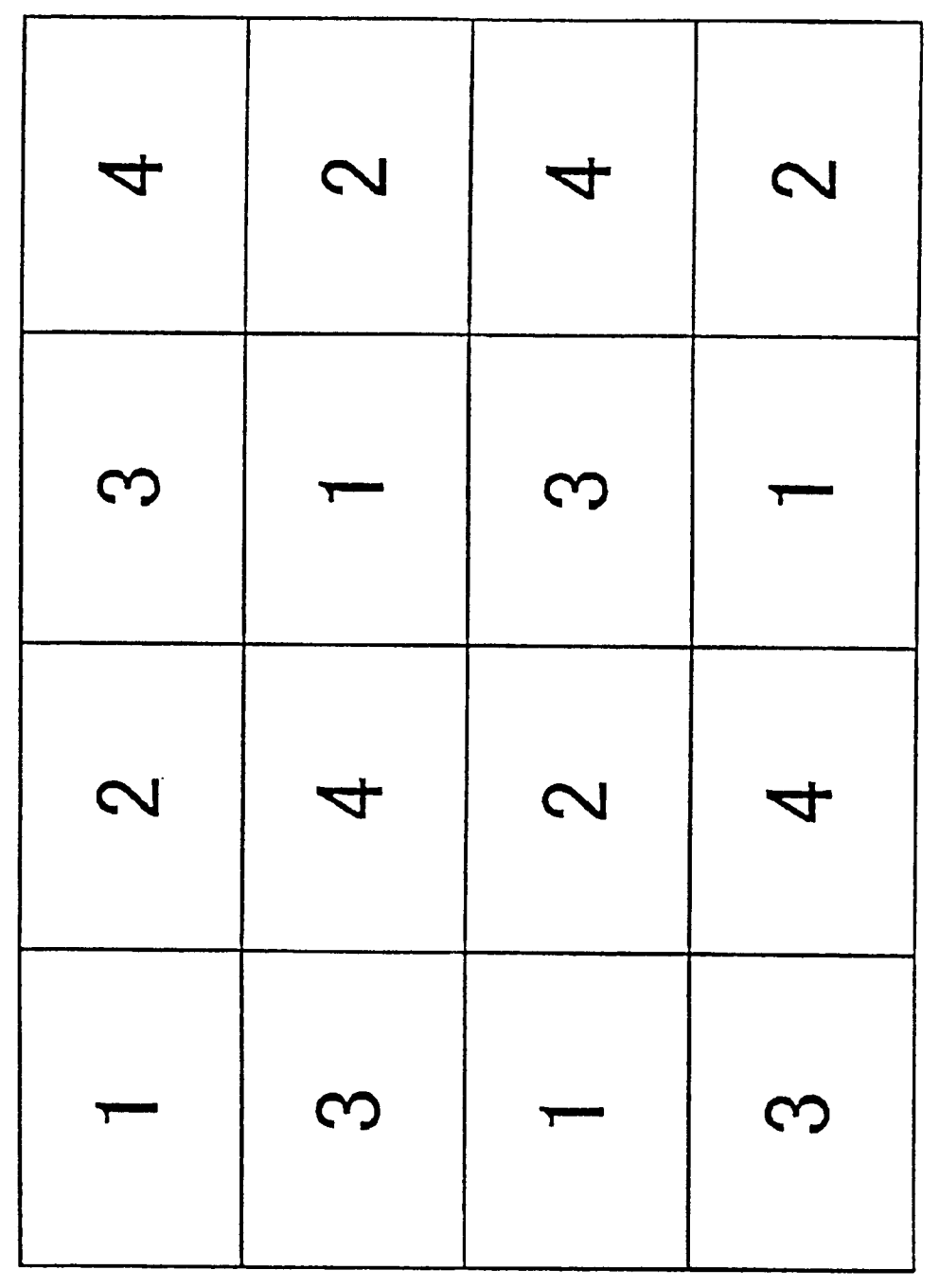

FIG. 5 is a diagram for explaining another screen division method. In FIG. 2, the division method suitable for the case where the application of concentrating the loads at the central portion of the CAD and the like was used was described. It can be said that FIG. 5 shows a screen division method suitable for the load distribution. In FIG. 5, the divided areas 1 to 4 are arranged so as to be scattered on the entire of the screen, and the respective loads are distributed. This screen division method is particularly effective when a graphics adapter is used, which has a function to perform a hardware geometric computing processing and a low speed image creation though it performs the clipping processing with a sufficiently high speed. In such case, the loads are distributed whichever portion of the screen is concentrically used, it is possible to prevent an extreme deterioration of the performance of the whole system.

Next, descriptions will be made for a case where the aspect ratio of the graphics adapter and the aspect ratio of the display (liquid crystal panel 33) differ from each other.

Figure 6:
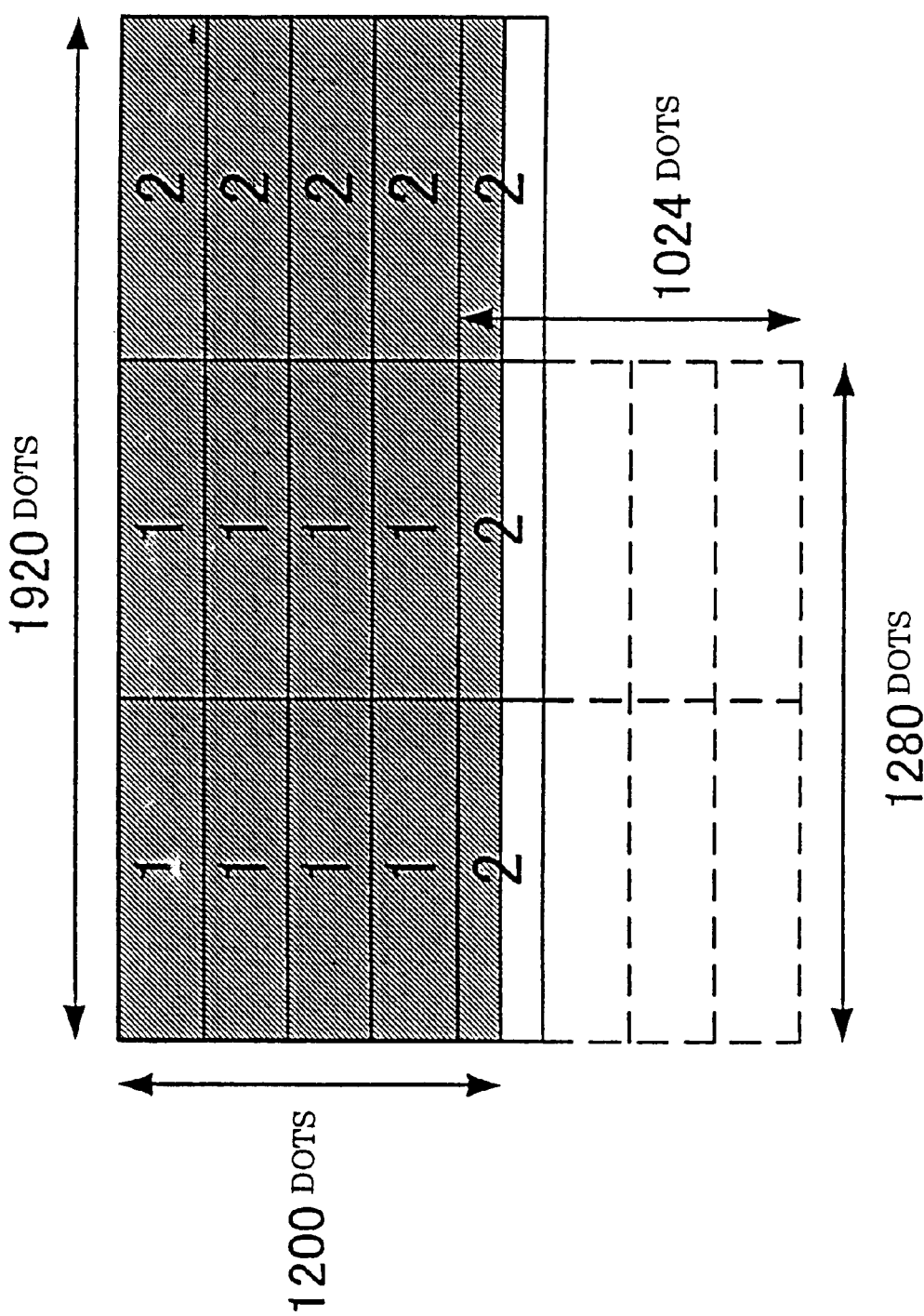
FIG. 6 is a diagram for explaining an example of a screen division method when aspect ratios are different.
Figure 9:
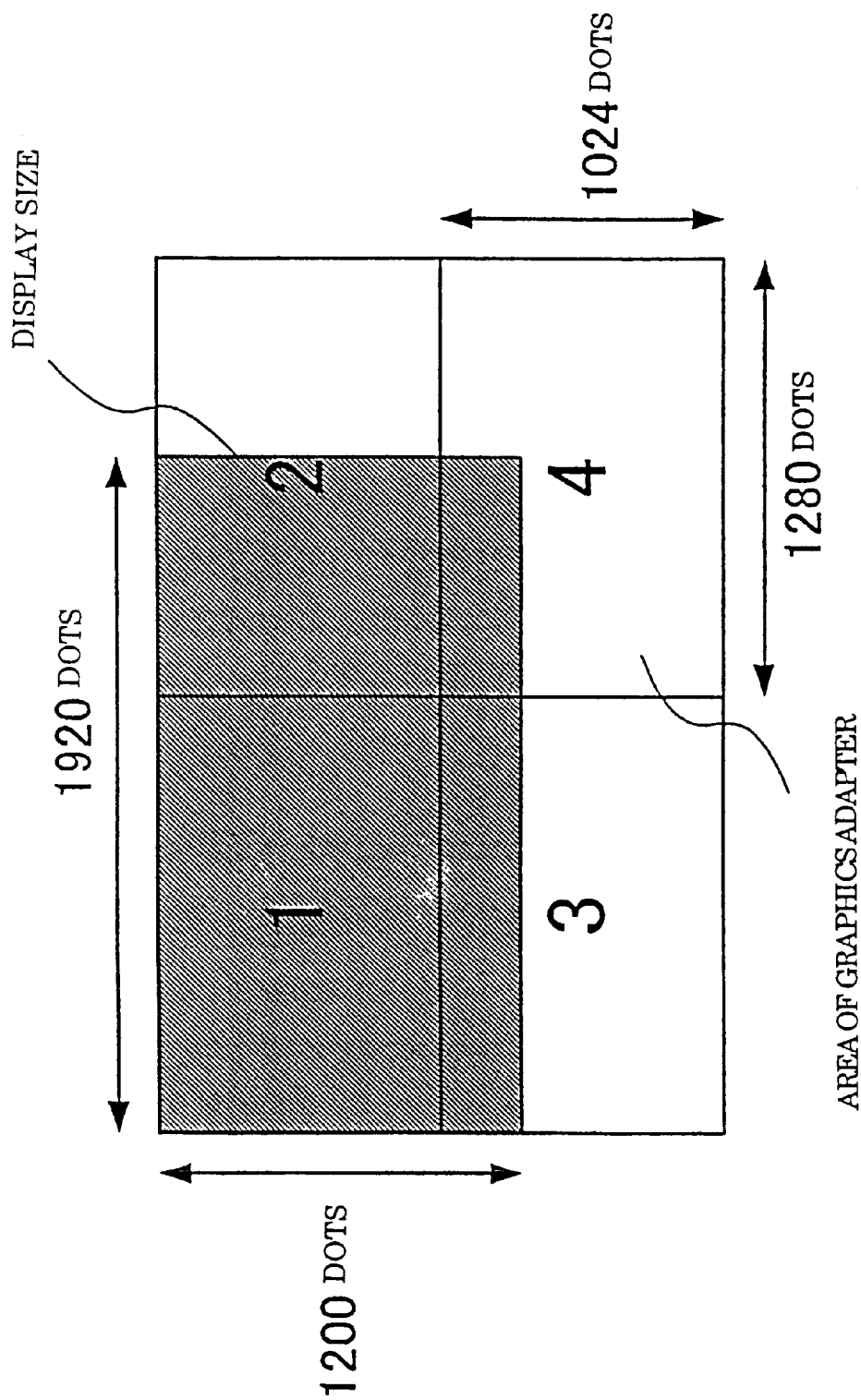
FIG. 9 is a diagram for explaining a case in which a screen size is not equal to an integral multiple of a size which is a proper scale for one graphics adapter to create an image.

FIG. 6 is a diagram for explaining an example of the screen division method in the case where the aspect ratios of the graphics adapter and the display differ. FIG. 6 shows a case where the area (1280×1024 dots) of the graphics adapter is divided equally to eight and the display (portion indicated by slanted lines) of 1920×1200 dots is displayed. In this example, the second graphics adapter covers an area of the display protruding from the area covered by the first graphics adapter. If the division method shown in FIG. 6 is adopted, the image data can be displayed on the rectangular display with more width than length by use of the two graphics adapters, and hence the useless memory area shown in FIG. 9 which was described in the prior art can be eliminated.

Figure 7:
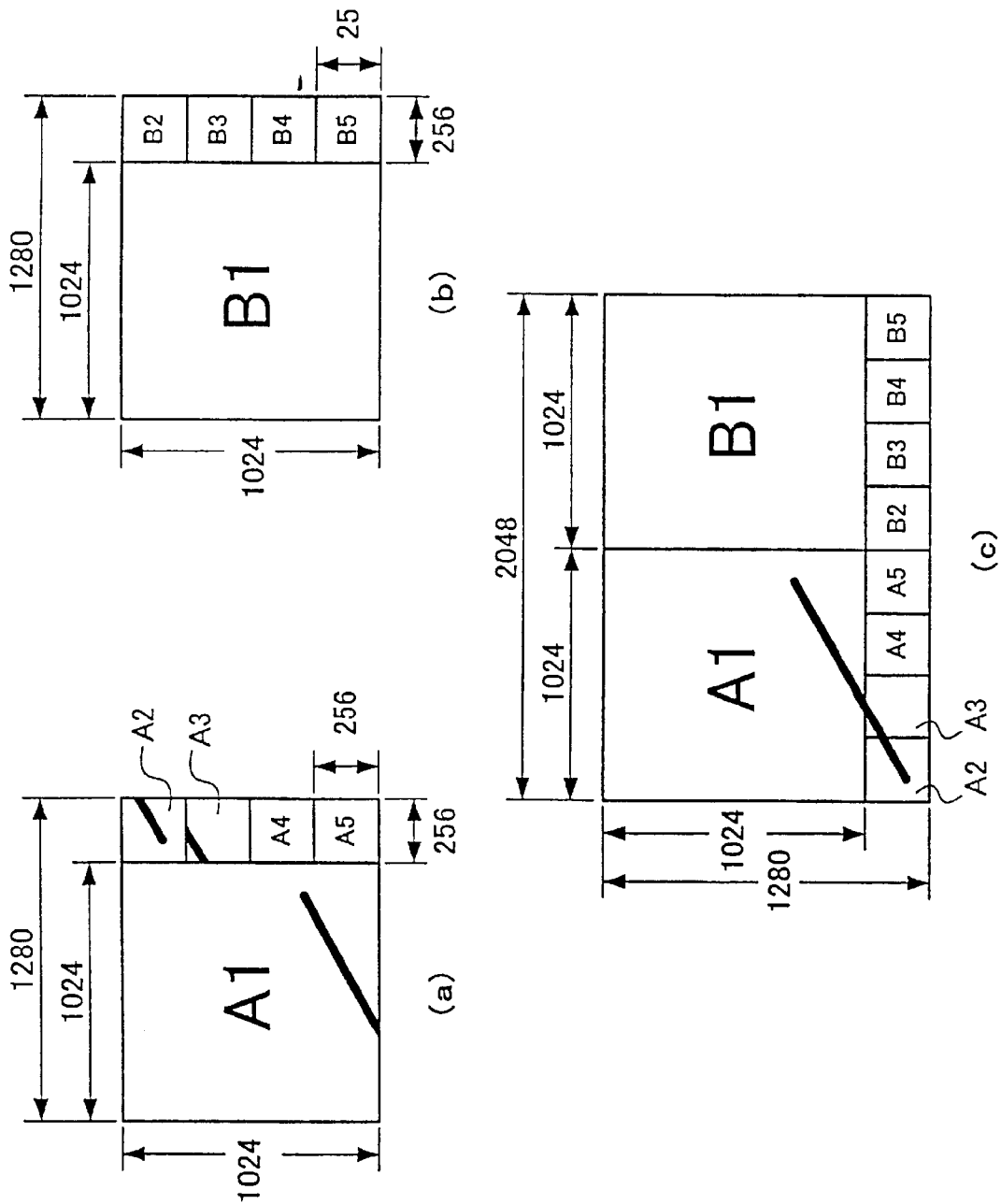
FIGS. 7(a), 7(b) and 7(c) are diagrams for explaining another example when an image display is performed using graphics adapters having different aspect ratios from that of a screen area.

FIGS. 7(a), 7(b) and 7(c) are diagrams for explaining another example in the case where an image display is performed using graphics adapters having a different aspect ratio from that of a screen area. FIGS. 7(a) and 7(b) show developing states by the graphics adapters A and B having an area of 1280×1024 dots, and FIG. 7(c) shows an area of a display having a display area of 2048×1280 dots. In this example, using a screen division method in which A1 and B1 are used as the divided area of 1024×1024 dots and A2 to A5 and B2 to B5 are used as the divided area of 256×256 dots, it is made to be possible to display an image on the display having a different aspect ratio. As shown in FIG. 7(a), in the graphics adapter A, thick lines are drawn for the divided areas A1, A2 and A3, and undergo the clipping processing to be stored in the frame buffer. In this example, in the graphics adapter B shown in FIG. 7(b), no image data to be created exists. Describing the reference numerals of FIG. 1, the image data from the graphics adapters A and B is stored in the frame buffer 31 of the liquid crystal display 30. Based on the assignment information, the image data is read out from the frame buffer 31 in turn by the reconstruction circuit 32, and sent out to the liquid crystal panel 33. As a result, the image as shown in FIG. 7(c) is displayed on the liquid crystal panel 33. From the fact that the divided areas A1, A2 and A3 in which the thick lines are drawn are read out as shown in FIG. 7(c), it can be understood that a straight line formed of the thick line is displayed continuously. Unlike the example of FIG. 6, also by allowing the sizes of the divided areas to be different from each other, an image can be displayed on the display having a different aspect ratio.

As described above, generally, the loads among the graphics adapters differ in many cases, and a speed of the image creation is decided with respect to the whole screen in the form that the whole system is ruled by a graphics adapter taking charge of the heaviest load. According to this embodiment, even when an image is displayed on the high resolution liquid crystal panel 33 using the conventional graphics adapters 13 to 16 with a low resolution, it is possible to distribute the loads for the graphics adapters 13 to 16, and the performance of the whole system can be improved. Moreover, according to this embodiment, even when an image is displayed on a screen size which is not equal to an integral multiple of a size of the conventional graphics adapter, specifically, even when an image is displayed on a high resolution display having a different aspect ratio, the frame buffer 31 in the graphics adapters 13 to 16 can be effectively used. As described above, the four graphics adapters 13 to 16 are not always necessary, and the graphics adapters of the random number composed of two or more graphics adapters may be provided according to the size of a screen or an application.

As described in detail, according to the present invention, it is possible to support a screen having a different aspect ratio or a large screen by use of, for example, existing graphics adapters, and performance and flexibility of the whole system can be increased.

Although illustrative embodiments of the present invention have been described herein with reference to the accompanying drawings, it is to be understood that the present invention is not limited to those precise embodiments, and that various other changes and modifications may be affected therein by persons ordinarily skilled in the art without departing from the scope or spirit of the invention. All such changes and modifications are intended to be included within the scope of the invention as defined by the appended claims.

What is claimed is:

1. A monitor system comprising:
   a display device having a screen for displaying an image, a display area of which is virtually divided into a plurality of first divided areas, each of said first divided areas being smaller than an area on which said screen can display the image, and being sub-divided into a plurality of second divided areas; and
   a plurality of graphics adapters for developing image data into said plurality of first and second divided areas of said display device,
   wherein each one of said plurality of first divided areas has a size and a scale corresponding to a resolution of one of the plurality of graphics adapters.

2. The monitor system according to claim 1, wherein said display device constructs the image from said image data output from said plurality of graphics adapters based on assignment information for each one of said plurality of second divided areas.

3. The monitor system according to claim 1, wherein a high performance graphics adapter of the plurality of graphics adapters is assigned to one of the plurality of first divided areas having a heavy image load.

4. The monitor system according to claim 1, wherein said plurality of graphics adapters are assigned to the plurality of second divided areas in a scattered arrangement for creating images therein.

5. A monitor system comprising:
   a display device including a screen with a resolution of a first aspect ratio, the screen being for displaying an image; and
   a plurality of graphics adapters, each having an area with a resolution of a second aspect ratio different from said first aspect ratio, for which image creation can be performed and each supplying, to said display device, image data corresponding to a resolution lower than that of said first aspect ratio of said screen, wherein:
      each area with the resolution of the second aspect ratio is divided into a plurality of sub-areas having a predetermined size;
      the image data supplied from each of said plurality of graphics adapters, with which image creation can be performed, is arranged in the plurality of sub-areas, and undergoes a clipping processing to isolate the image data in the plurality of sub-areas according to each respective graphics adapter to which each one of the plurality of sub-areas correspond; and
      said display device reconstructs said image data supplied from said plurality of graphics adapters, and outputs said image data to said screen with the resolution of the first aspect ratio.

6. The monitor system according to claim 5, wherein said image data supplied from the graphics adapters is arranged in the plurality of sub-areas based on image creation assignment information.

7. The monitor system according to claim 5, wherein said display device reads out and reconstructs the image data of the plurality of sub-areas supplied from said plurality of graphics adapters based on image creation assignment information.

8. A display device comprising:
   a frame buffer for storing divided image data received from a plurality of graphics adapters capable of creating an image with a low resolution;
   a reconstruction section for reading out said divided image data stored in said frame buffer in turn based on a predetermined assignment, and forming display data; and
   a high resolution screen for displaying an image based on said display data formed by said reconstruction section,
   wherein said divided image data stored in said frame buffer is obtained by sub-dividing the data of each area having a size and scale corresponding to the low resolution of one of the plurality of graphics adapters into a plurality of sub-areas, each of the plurality of sub-areas having the same size or having one of at least two sizes.

9. The display device according to claim 8, wherein said high resolution screen has a display area having an aspect ratio different from that of the area corresponding to the low resolution of one of the plurality of graphics adapters.

10. A method of displaying an image on a large screen by use of a plurality of graphics adapters, comprising the steps of:
   forming divided image data having a size obtained by sub-dividing each area corresponding to a resolution of said graphics adapters, wherein the size of each piece of the divided image data is the same or one of at least two sizes;

reading out said divided image data developed into said graphics adapters in a predetermined order and reconstructing said divided image data; and displaying an image on said screen based on said divided image data reconstructed.

11. The method according to claim 10, wherein assignments of said divided image data to said graphics adapters are performed based on assignment information indicating which portion of said screen is taken charge of by a specific graphics adapter among said graphics adapters.

12. The method according to claim 10, wherein a reconstruction of said divided image data is read out in a predetermined order based on assignment information.

13. An image display method to display an image on a high resolution screen of a first aspect ratio, by use of a plurality of low resolution graphics adapters, each being capable of displaying an image having a second aspect ratio different from the first aspect ratio, comprising the steps of:

forming divided image data in a size obtained by subdividing the image displayed by each of said low resolution graphics adapters into a plurality of areas, wherein the image displayed by each low resolution graphics adapter forms part of the image on said high resolution screen;

assigning said divided image data to each of said low resolution graphics adapters based a degree of a load required for displaying said divided image data;

reading out and reconstructing said divided image data assigned to each of said low resolution graphics adapters in an order to create the image on said high resolution screen; and displaying said divided image data reconstructed on said high resolution screen.

14. The method according to claim 13, wherein the order of reading out and reconstructing the divided image data is based on predetermined assignment information.

* * * * *